United States Patent Office 3,003,396
Patented Oct. 10, 1961

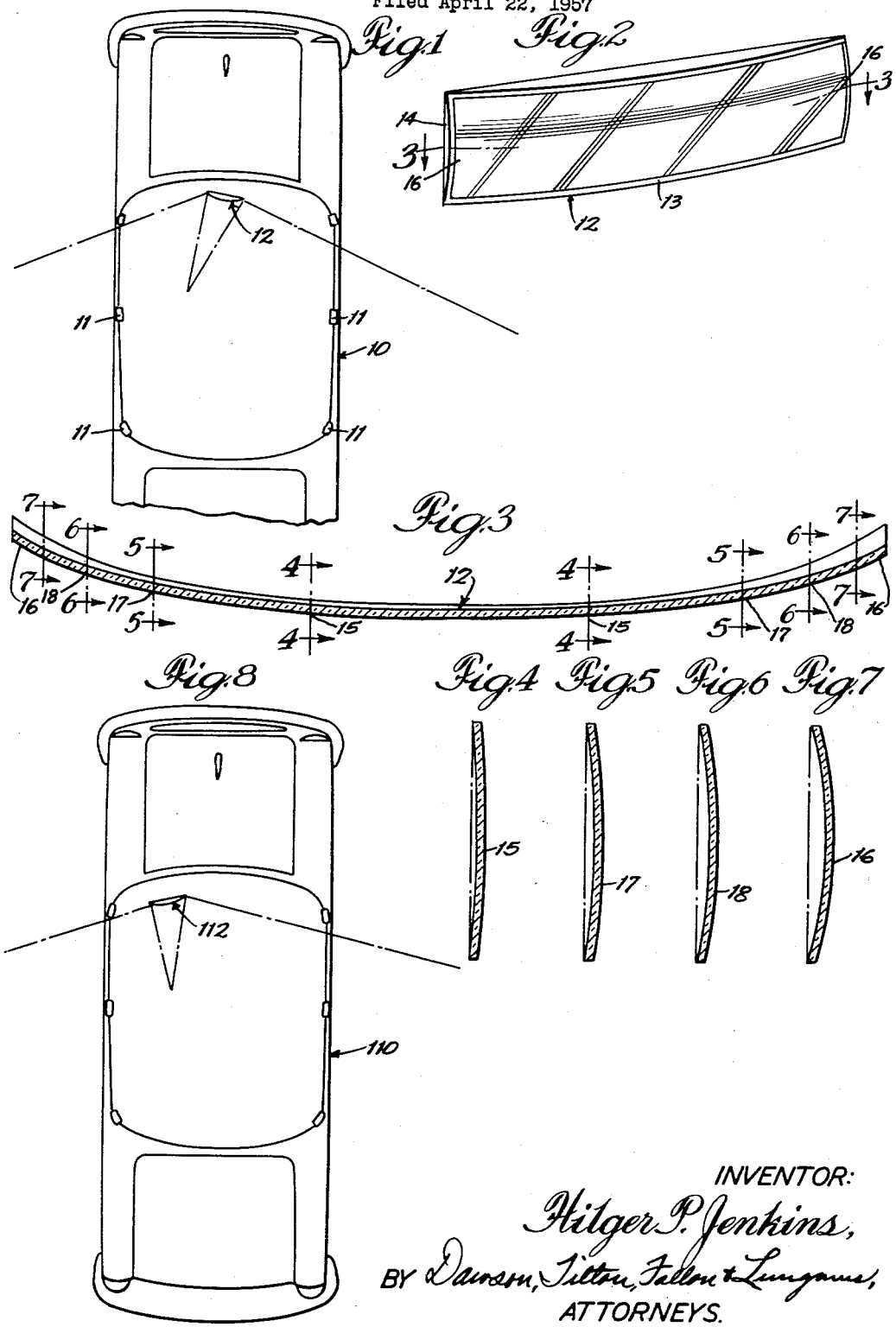

1

3,003,396
AUTOMOBILE MIRROR
Hilger P. Jenkins, 5510 Woodlawn Ave., Chicago, Ill.
Filed Apr. 22, 1957, Ser. No. 654,210
2 Claims. (Cl. 88—87)

This invention relates to an automobile mirror, and more particularly, to a mirror permitting the driver of an automobile to obtain a wide range of view.

With the advent of high speed driving, especially on multi-lane highways, the need for superior driver visibility becomes pronounced. It is not uncommon for collisions to occur where a car moves out of the lane it previously was in and moves into the path of a faster moving car coming along one's side. A quick reliable means for ascertaining whether the path of a car is clear on the sides of the car is therefore very desirable. It is believed that this phase of safe driving has been overlooked to a substantial extent not withstanding the rapid advances made in providing safety features on modern automobiles.

To a certain extent, a solution to this safety problem has been approached by placing additional mirror surfaces in and about the car. These expedients all suffer from the drawback of requiring additional time to utilize them for providing information about the surroundings of the automobile. This is particularly critical at high speeds where time is of the essence and deviation of the driver's view from his path might well result in an accident. This is particularly true with reflecting surfaces that are provided in and about a car separated from the main rear view mirror. On the other hand, attempts to provide information about the surroundings of the automobile by providing wing-like reflecting surfaces on the main mirror suffer from the drawback of requiring the driver's eyes to accommodate to the different reflections, thereby again requiring a period of time in which the driver's eyes are averted from the path of the automobile directly ahead.

Still another drawback of expedients proposed to solve the problem of providing full information about a car's surroundings is that they imperfectly present this information. Anything less than a panoramic view results in gaps of the surroundings which may mislead the driver into believing that his proposed change in driving direction may be safe.

It is therefore a general object of this invention to provide a new type of reflecting surface, especially suited for automobiles, which overcomes the problems and disadvantages set forth above. Another object is to provide an automobile viewing mirror that provides substantially complete information about the character of the surroundings of an automobile. Still another object is to provide an automobile viewing mirror that effectively permits receipt of information to the rear and the side of the driver not ordinarily visible to the driver without turning his head. Yet another object is to provide an automobile viewing mirror that presents information about the surroundings both behind and at the side of the driver in a form where distortion is minimized. Other objects and advantages of this invention can be seen as this specification proceeds.

This invention will be described, in an illustrated embodiment, in conjunction with the accompanying drawing, in which—

FIGURE 1 is a top view of an automobile equipped with a mirror embodying teachings of this invention; FIGURE 2 is a perspective view of a mirror suitable for installation in an automobile and embodying teachings of this invention; Figure 3 is an enlarged cross sectional view taken along the line 3—3 of FIGURE 2; FIGURES 4–7 are sectional views taken along the lines 4—4, 5—5,

2

6—6 and 7—7, respectively of FIGURE 3; and FIGURE 8 is a view similar to FIGURE 1 but showing an alternative mounting of a mirror in an automobile.

In the illustration given the numeral 10 in FIGURE 1 designates generally an automobile. Automobile 10 is shown in fragmentary form and without a top, thereby revealing posts 11 which serve to define doorways and window area. Mounted within automobile 10 along the longitudinal center line thereof by suitable mounting means (not shown) is a mirror generally designated 12 and shown more clearly in FIGURES 2–7.

Mirror 12, as seen in FIGURE 2 is arcuate in configuration. The arcuate nature of mirror 12 exists in both the major and minor dimensions of the generally rectangular shape of mirror 12. The arcuate nature in the major dimension can be readily perceived by noting the curvature along the bottom of mirror 12 and as designated by the numeral 13. The arcuate nature of mirror 12 and its minor dimension can be appreciated from a consideration of the curvilinear nature of an end of mirror 12 as is designated by the numeral 14 in FIGURE 2.

Turning now to FIGURE 3 a sectional view depicting the arcuate nature of mirror 12 along the major dimension thereof is seen. An important feature of mirror 12 as can be perceived from FIGURE 3 is that the curvature of the reflecting surface is greater as the ends are approached. Satisfactory results are obtained in a curved mirror embodying teaching of my invention when the radius of curvature of the end portions of the mirror is about one-quarter to one-eighth the radius of curvature of the central portion thereof. The portions of mirror 12 intermediate the central and end portions have radii of curvature intermediate the radii of curvature characteristic of the central and end portions.

Mirror 12 is also curved in the direction of its minor dimension as can be appreciated from a consideration of FIGURES 4–7. The curvature introduced along the minor dimension corresponds at any particular point approximately to the curvature present along the major dimension. Thus, the curvature in FIGURE 7 is produced by a radius approximately one-fourth the radius producing the curvature in FIGURE 4. I have found that introducing two degrees of curvature, particularly in the end portions of mirror 12 substantially minimizes any undesirable distortion of objects viewed by means of mirror 12.

Through the use of a unitary reflecting surface embodying a gradually increasing curvature as the ends are increased, I have found that a substantially gap-free panoramic view of the surroundings of an automobile 10 can be obtained. Optimum results are obtained when mirror 12 is extended a length sufficient to bring within view all objects to the rear and side of a driver of automobile 10 which are not ordinarily visible without the driver having to turn his head. Thus, a quick glance at mirror 12 permits the driver of automobile 10 to readily perceive all that is going on about him without having to divert his view from the road ahead for a dangerously long period.

My invention can be further appreciated from a consideration of the following example.

EXAMPLE

A mirror was constructed embodying teachings of my invention from a thermoplastic resinous material overlaid with a silver coating to provide a reflecting surface. The length of the mirror in its major dimension was about 11½ inches while its width (i.e. the minor dimension) was about 3 inches. The curvature in the central portion 15 (see FIGURE 4) was produced by forming the mirror on a radius of curvature of about 106 centimeters. The end portions of the mirror designated 16 (see FIG- URE 7) were provided with a curvature corresponding to being formed on a radius of curvature of about thirteen centimeters. Alternatively expressed, the curvature at portion 15 was approximately one diopter while that at portions 16 was four diopters. Although the expression "diopter" is usually employed in connection with lenses wherein it is equal to the reciprocal of the focal length in meters, it can be conveniently employed as a means for characterizing mirrors constructed according to my invention. The convenience of employment of this term can be appreciated through the use of an optical measuring device which, when applied to a curved surface, indicates the curvature in terms of diopters. Ready conversion can be effected by reference to the following table wherein diopters are shown in terms of radii of curvature.

*Table*

| Diopter: | | Radius |
|---|---|---|
| ½ | cm | 106 |
| 1 | cm | 53 |
| 2 | cm | 26.5 |
| 3 | cm | 17.67 |
| 4 | cm | 13.25 |
| 5 | cm | 10.6 |

The curvature at portion 17 corresponding to FIGURE 5 was about two diopters, i.e., a radius of curvature of twenty-six centimeters while the curvature at portion 18 (see FIGURE 6) was three diopters or a curvature corresponding to having mirror 12 formed about a radius of seventeen centimeters. In the mirror of this example, there were no abrupt changes in curvature which might otherwise introduce undue distortion in reflection. The central portion 15 of least curvature comprehended a substantial portion of the length of mirror 12. In the example given the length of portion 15 that was of a uniform minimum curvature extended over about three and one-half inches, or about one and three-quarter inches on each side of a vertical center-line, the measurement being perpendicular to the center-line. A curvature corresponding to a radius of curvature of 26.5 centimeters occurred on about four inches to the side of a vertical center-line through mirror 12. A curvature of three diopters corresponding to a radius of curvature of 17.67 centimeters occurred at about four and seven-eighths inches from a vertical center-line while a curvature of four diopters was present in the end portion of the mirrors commencing at a point spaced approximately five and one-quarter inches from a vertical center-line through mirror 12.

Especially satisfactory results are obtained when the curvature between the lines 4—4 of FIGURE 1, i.e., the central portion is of the order of one-half diopter (106 centimeters). This permits reflections from directly behind automobile 10 to appear with minimum reduction in size. Although convex mirrors have been proposed by others in an attempt to provide a wide range of vision about and behind a car, the previously employed mirrors were constructed of uniform curvature, being spherical rather than spheroidal. These mirrors thus had the disadvantage of making the cars approaching from some distance to the rear quite small so that it was difficult to evaluate distance or speed. In contradistinction to this, mirrors constructed in accordance with my invention provide a reflection from directly behind with minimum reduction in size. On the other hand, the primary need for reflecting surface for the car sides is for objects close at hand, objects which can be diminished in size without loss of discernibility. By increasing mirror curvature at the ends thereof, I am able to provide in a compact reflecting surface rather large scale information of distant objects rearward of the car and full but somewhat reduced size information of nearer objects to the side.

However, even the slight central curvature in mirrors constructed according to my invention is desirable since it substantially minimizes the reflected glare from the headlights of cars behind that is present in flat reflecting surfaces.

Equally satisfactory results can be obtained by constructing mirror 12 of other materials. Materials found suitable for this purpose include both thermoplastic and thermal setting resinous materials as well as glass. It may be desirable in some instances to provide a framework for mirror 12 that supports the mirror in its desired configuration and also provides a convenient means for mounting the mirror.

In FIGURE 8 an alternative mounting for a curvilinear mirror 112 is seen in an automobile 110. In this aspect of my invention mirror 112 is mounted directly over the line of vision of a driver looking straight ahead. This further minimizes the time that a driver's eyes must be diverted from the road straight ahead, thereby minimizing the chances of an accident occurring. Where a mirror 112 is placed as shown in FIGURE 8, I have found it desirable to slightly change the configuration of the mirror from that shown in FIGURE 3. In such a change, the portion of minimum curvature such as is designated 15 in FIGURE 4 is not centrally disposed of the mirror but is shifted toward the left. Thus, there is greater curvature at the extreme right end of the mirror than there is at the left. This provides the driver with a reflection that more accurately represents the surroundings of the car. The reflection seen in the portion of least curvature 15 is intended to be that seen through the large rear window of an automobile. Since mirror 112 is located to the left of the longitudinal center-line of the car, there is less surroundings needed to be reflected in the left portion of the mirror than there is in the right hand portion.

Furthermore, when mirror 112 is placed directly in front of the driver and just above his line of vision of the road ahead, i.e., where a sun shade or visor is located, it is possible to detect cars in this mirror attempting to pass on either side even though the driver may have his eyes focused on the road ahead.

While in the foregoing specification I have set forth a specific structure in detail for the purpose of illustrating the invention it will be understood that such details of structure may be varied widely by those skilled in the art without departing from the spirit of my invention.

I claim:

1. In an automobile mirror capable of presenting a panoramic reflection of the side and rear surroundings of an automobile, a unitary convexly curved reflecting surface of a generally rectangular outline thereby defining pairs of longer and shorter sides, the pair of longer sides being disposed generally horizontally, the said curved surface being defined by radii of curvature that decrease in proceeding from the central portion of said surface toward both pairs of side edges, the radius of curvature defining the curvature of the surface adjacent said shorter edges being one-fourth to one-eighth the radius of curvature defining said central portion, said central portion radius being about one meter.

2. In an automobile mirror, a unitary convexly curved reflecting surface, the surface having longer and shorter edges defining a generally rectangular outline, said surface being capable of presenting a panoramic reflection of the side and rear surroundings of an automobile when said longer edges are disposed generally horizontally, said surface having a central curved portion defined by a radius of curvature of about one meter, said surface being defined by radii that decrease gradually in proceeding parallel to said longer edges from said central portion to the said shorter edges, said surface being curved in a direction parallel to said shorter edges, the ratio of radii of said central portion and the surface immediately adjacent said shorter edges being in the range of four to one to eight to one, and the ratio of said longer and shorter edges about four to one.

(References on following page)

References Cited in the file of this patent

UNITED STATES PATENTS

| | | |
|---|---|---|
| 1,643,420 | Porter | Sept. 27, 1927 |
| 1,709,752 | Solenberger et al. | Apr. 16, 1929 |
| 1,872,905 | Darling | Aug. 23, 1932 |
| 1,910,119 | Moats | May 23, 1933 |
| 2,615,368 | Bindley | Oct. 28, 1952 |
| 2,857,810 | Troendle | Oct. 28, 1958 |

FOREIGN PATENTS

| | | |
|---|---|---|
| 18,472 | Great Britain | 1910 |